US008055576B2

(12) United States Patent
Merrin et al.

(10) Patent No.: US 8,055,576 B2
(45) Date of Patent: *Nov. 8, 2011

(54) ELECTRONIC SECURITIES MARKETPLACE HAVING INTEGRATION WITH ORDER MANAGEMENT SYSTEMS

(75) Inventors: Seth I. Merrin, New York, NY (US); John Halloran, New York, NY (US); Demian Kosofsky, Redmond, WA (US); Kevin Lupowitz, New York, NY (US)

(73) Assignee: Liquidnet Holdings, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/939,484

(22) Filed: Nov. 4, 2010

(65) Prior Publication Data

US 2011/0047068 A1 Feb. 24, 2011

Related U.S. Application Data

(62) Division of application No. 09/834,171, filed on Apr. 12, 2001, now Pat. No. 7,136,834.

(60) Provisional application No. 60/242,373, filed on Oct. 19, 2000.

(51) Int. Cl.
*G06Q 40/00* (2006.01)
(52) U.S. Cl. ............... 705/37; 705/35; 705/36 R
(58) Field of Classification Search ............... 705/36–37
See application file for complete search history.

(56) References Cited

U.S. PATENT DOCUMENTS

| | | | |
|---|---|---|---|
| 2,134,118 A | 10/1938 | Foss | |
| 3,573,747 A | 4/1971 | Adams et al. | |
| 3,581,072 A | 5/1971 | Nymeyer et al. | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,774,663 A | 9/1988 | Musmanno et al. | |
| 4,823,265 A | 4/1989 | Nelson | |
| 4,903,201 A | 2/1990 | Wagner | |
| 5,077,665 A | 12/1991 | Silverman et al. | |
| 5,101,353 A | 3/1992 | Lupien et al. | |
| 5,126,936 A | 6/1992 | Champion et al. | |
| 5,136,501 A | 8/1992 | Silverman et al. | |

(Continued)

FOREIGN PATENT DOCUMENTS

EP 0401203 12/1990

(Continued)

OTHER PUBLICATIONS

*Investment Technology Group, Inc. et al. v. Liquidnet Holdings Inc.; Liquidnet Holdings Inc. v. Pulse Trading, Inc.*; Southern District of New York; Case 1:07-cv-00510-SAS-HBP; Opinion & Order 07 Civ.510 (SAS) 07 Civ.6886 (SAS); dated Jan. 19, 2010.

(Continued)

*Primary Examiner* — Alexander Kalinowski
*Assistant Examiner* — Abhishek Vyas
(74) *Attorney, Agent, or Firm* — Greenberg Traurig, LLP

(57) ABSTRACT

An electronic trading marketplace (ETM) communicates with interfacing modules interfacing directly with order management systems (OMS's) at trading institutions. The interfacing modules automatically transmit orders from the OMS databases to the ETM and update the OMS databases in response to orders executed at the ETM. Traders can communicate with the ETM to anonymously negotiate trades of securities.

56 Claims, 8 Drawing Sheets

U.S. PATENT DOCUMENTS

| | | | |
|---|---|---|---|
| 5,148,365 A | 9/1992 | Dembo | |
| 5,168,446 A | 12/1992 | Wiseman | |
| 5,297,031 A | 3/1994 | Gutterman et al. | |
| 5,305,200 A | 4/1994 | Hartheimer et al. | |
| 5,375,055 A | 12/1994 | Togher et al. | |
| 5,497,317 A | 3/1996 | Hawkins et al. | |
| 5,517,406 A | 5/1996 | Harris et al. | |
| 5,544,355 A | 8/1996 | Chaudhuri et al. | |
| 5,592,375 A | 1/1997 | Salmon et al. | |
| 5,615,269 A | 3/1997 | Micali | |
| 5,664,115 A | 9/1997 | Fraser | |
| 5,689,652 A | 11/1997 | Lupien et al. | |
| 5,710,889 A | 1/1998 | Clark et al. | |
| 5,715,402 A | 2/1998 | Popolo et al. | |
| 5,717,989 A | 2/1998 | Tozzoli et al. | |
| 5,727,165 A | 3/1998 | Ordish et al. | |
| 5,787,402 A * | 7/1998 | Potter et al. | 705/37 |
| 5,794,207 A | 8/1998 | Walker et al. | |
| 5,794,219 A | 8/1998 | Brown et al. | |
| 5,809,483 A | 9/1998 | Broka et al. | |
| 5,818,914 A | 10/1998 | Fukisaki | |
| 5,835,087 A | 11/1998 | Herz et al. | |
| 5,842,178 A | 11/1998 | Giovanndi et al. | |
| 5,845,266 A | 12/1998 | Lupien et al. | |
| 5,873,071 A | 2/1999 | Festenberg et al. | |
| 5,897,620 A | 4/1999 | Walker et al. | |
| 5,924,082 A | 7/1999 | Silverman et al. | |
| 5,924,083 A | 7/1999 | Silverman et al. | |
| 5,926,801 A | 7/1999 | Matsubara et al. | |
| 5,950,176 A | 9/1999 | Keiser et al. | |
| 5,950,177 A | 9/1999 | Lupien et al. | |
| 5,970,479 A * | 10/1999 | Shepherd | 705/37 |
| 6,012,046 A | 1/2000 | Lupien et al. | |
| 6,014,627 A | 1/2000 | Togher et al. | |
| 6,029,146 A | 2/2000 | Hawkins et al. | |
| 6,029,195 A | 2/2000 | Herz | |
| 6,055,504 A | 4/2000 | Chou et al. | |
| 6,058,379 A | 5/2000 | Odom et al. | |
| 6,112,189 A * | 8/2000 | Rickard et al. | 705/36 R |
| 6,131,087 A | 10/2000 | Luke et al. | |
| 6,134,535 A | 10/2000 | Belzberg | |
| 6,141,653 A | 10/2000 | Conklin et al. | |
| 6,157,918 A | 12/2000 | Shepherd | |
| 6,195,647 B1 | 2/2001 | Martyn et al. | |
| 6,247,000 B1 | 6/2001 | Hawkins et al. | |
| 6,266,652 B1 | 7/2001 | Godin et al. | |
| 6,278,982 B1 | 8/2001 | Korhammer et al. | |
| 6,313,833 B1 | 11/2001 | Knight | |
| 6,349,291 B1 | 2/2002 | Varma | |
| 6,401,080 B1 | 6/2002 | Bigus et al. | |
| 6,408,282 B1 | 6/2002 | Buist | |
| 6,418,419 B1 | 7/2002 | Nieboer et al. | |
| 6,421,653 B1 | 7/2002 | May | |
| 6,493,683 B1 | 12/2002 | David et al. | |
| 6,505,174 B1 | 1/2003 | Keiser et al. | |
| 6,505,175 B1 | 1/2003 | Silverman et al. | |
| 6,564,191 B1 | 5/2003 | Reddy | |
| 6,704,716 B1 | 3/2004 | Force | |
| 6,747,692 B2 | 6/2004 | Patel et al. | |
| 6,968,318 B1 | 11/2005 | Fersternberg et al. | |
| 7,035,819 B1 | 4/2006 | Gianakouros et al. | |
| 7,107,240 B1 * | 9/2006 | Silverman et al. | 705/37 |
| 7,136,834 B1 * | 11/2006 | Merrin et al. | 705/37 |
| 7,149,713 B2 | 12/2006 | Bove et al. | |
| 7,747,515 B1 | 6/2010 | Merrin et al. | |
| 7,831,507 B2 | 11/2010 | Merrin et al. | |
| 2001/0037284 A1 | 11/2001 | Finkelstein et al. | |
| 2001/0047323 A1 | 11/2001 | Schmidt | |
| 2002/0007335 A1 | 1/2002 | Millard et al. | |
| 2002/0032632 A1 | 3/2002 | Sernet | |
| 2002/0035533 A1 | 3/2002 | Mache et al. | |
| 2002/0052820 A1 | 5/2002 | Mahanti et al. | |
| 2002/0055901 A1 | 5/2002 | Gianakouros et al. | |
| 2002/0099647 A1 | 7/2002 | Howorka et al. | |
| 2002/0103732 A1 | 8/2002 | Bundy et al. | |
| 2002/0128955 A1 | 9/2002 | Brady et al. | |
| 2002/0174045 A1 | 11/2002 | Arena et al. | |
| 2003/0004859 A1 | 1/2003 | Shaw et al. | |
| 2003/0014354 A1 | 1/2003 | Madoff et al. | |
| 2003/0050888 A1 | 3/2003 | Satow et al. | |
| 2003/0061069 A1 | 3/2003 | Silverman et al. | |
| 2003/0093362 A1 | 5/2003 | Tupper et al. | |
| 2003/0216932 A1 | 11/2003 | Foley | |
| 2003/0220868 A1 | 11/2003 | May | |
| 2003/0229563 A1 | 12/2003 | Moore et al. | |
| 2003/0229566 A1 | 12/2003 | Moore et al. | |
| 2004/0034591 A1 | 2/2004 | Walebroeck et al. | |
| 2004/0172356 A1 | 9/2004 | Agarwal et al. | |
| 2004/0199453 A1 | 10/2004 | Brady et al. | |
| 2005/0108140 A1 | 5/2005 | Motte et al. | |
| 2005/0114254 A1 | 5/2005 | Condie | |
| 2005/0197857 A1 | 9/2005 | Avery | |
| 2005/0234805 A1 | 10/2005 | Robertson et al. | |
| 2006/0015446 A1 | 1/2006 | Burkhardt et al. | |
| 2006/0026090 A1 | 2/2006 | Balabon | |
| 2006/0031153 A1 | 2/2006 | Kim | |
| 2006/0059082 A1 | 3/2006 | Silverman et al. | |
| 2006/0080220 A1 | 4/2006 | Samuel | |
| 2006/0085317 A1 | 4/2006 | Allen | |
| 2006/0089899 A1 | 4/2006 | Durkin et al. | |
| 2010/0250429 A1 | 9/2010 | Merrin et al. | |

FOREIGN PATENT DOCUMENTS

| | | |
|---|---|---|
| JP | 2004-287893 | 10/2004 |
| WO | 95/06918 | 3/1995 |
| WO | 96/34357 | 1/1996 |
| WO | 00/70518 | 11/2000 |
| WO | 01/25996 | 4/2001 |

OTHER PUBLICATIONS

*Investment Technology Group Inc. et at v. Liquidnet Holdings, Inc.*; Southern District of New York, Civil Action No. 07 CIV 510 (GEL/HP); Reply to Amended Counterclaims Made in Response to Amended Complaint; dated Mar. 31, 2008.

*Investment Technology Group Inc. et al v. Liquidnet Holdings, Inc.*; Southern District of New York, Civil Action No. 1:07-cv-00510-GEL; Liquidnet's Open Claim construction Brief, with Exhibits; dated Mar. 23, 2009.

*Investment Technology Group Inc. et at v. Liquidnet Holdings, Inc.*; Southern District of New York, Civil Action No. 07 CIV 510 (GEL/HP); Liquidnets' Reply claim Construction Brief, with Exhibits; dated Apr. 17, 2009.

*Investment Technology Group Inc. et al v. Liquidnet Holdings, Inc.*; Southern District of New York, Civil Action No. 1:07-cv-00510-GEL; Opening Brief of Investment Technology Group Inc. et al. and Pulse Trading, Inc. Concerning Claim Construction, and Exhibits, dated Mar. 20, 2009.

*Investment Technology Group Inc. et al v. Liquidnet Holdings, Inc.*; Southern District of New York, Civil Action No. 1:07-cv-00510-GEL; Response Brief in Investment Technology Group, Inc. et al. and Pulse Trading, Inc. Concerning Claim Construction, dated Apr. 17, 2009.

E-mail string containing an e-mail dated Jun. 19, 1998 from Eric Legoff to James Nikolai transmitting the Proposal to Jeffries & Company, Inc.

VIE Systems, Inc.: "Proposal to Jeffries & Company, Inc.," Jun. 19, 1998, pp. 1-16.

K. Lupowitz: "Merrin (DOS)/Harborside Installation Guide," Jul. 28, 1998, 7 pages.

T. Tarrant: "@Harborside Links Demonstrate New Paradigm as Leading Order Management and Network Vendors Connect," Jul. 12, 1999, 3 pages.

Microsoft Press Computer Dictionary, Third Edition, 1997, p. 456.

J. Davis: "Big Storm Rising," Business 2.0, Sep. 1, 1998, 2 pages.

A. Svaidi: "Wall Street Turns to Durango for Help," Denver Business Journal, Jan. 30, 1998, 3 pages.

LEXSEE 1991 SEC No-Act. Lexis 1112, Oct. 1, 1991, 16 pages.

Victor Kulkosky, "Making Connections in Off-Exchange Trading," Wall Street & Technology, New York, Oct. 1993, vol. 11, Iss. 5, p. 14, 4 pgs.

Peter Chapman, "Merrin's Solution to Liquidity Problems," Traders Magazine, Oct. 2000, vol. 13, Iss. 173, p. 54, 3 pgs.

Mary Schroeder, "Liquidnet to Build Interfaces With Four OMSs," Securities Industry News, Nov. 2000, vol. 12, Iss. 43, p. 5, 1 pg.

Anthony Guerra, "Will Liquidnet Catch the Buy Side," Wall Street & Technology, Jul. 2001, 19, 7, p. 75, 3 pgs.

www.liquidnet.com "Have a Change", Why Use Liquidnet: Features & Benefits, 5 pages.

European Office Action in connection with European Patent Appln. 98921236.0 dated Dec. 14, 2007.

Japanese Office Action in connection with Japanese Appln. 10/549604 dated May 13, 2008.

*Investment Technology Group Inc. et al* v. *Liquidnet Holdings, Inc.*; Southern District of New York, Civil Action No. 1:07-cv-00510-GEL; Notice of Motion for Leave to File Amended Complaint, Exhibits attached; dated Jan. 10, 2008.

*Investment Technology Group Inc. et al* v. *Liquidnet Holdings, Inc.*; Southern District of New York, Civil Action No. 07 CIV 510 (GEL/HP); Liquidnet's Memorandum of Law in Opposition to the Declaratory Judgment Plaintiffs Motion for Leave to Amend Their Complaint; dated Jan. 25, 2007.

Oxford, J., "Trading on the Frontier," Plan Sponsor, Oct. 1996.

Kansas, D., "OptiMark Technologies to Announce Trading System Aimed at Institutions," Wall Street Journal, Sep. 24, 1996.

Banks, H., "Great Expectations," Forbes, Dec. 2, 1996.

"NYSE Technology Chief Joins Digital Stock Market Effort; Wit Capital Acquires Software Plus Core Development Team," Business Wire, Sep. 4, 1996.

Letter to Attorney Simon at Foley & Lardner from the SEC, Nov. 30, 1994 regarding Chicago Match with enclosure The Chicago Match Functional Specification Input via Extensive Text File.

Platform 2.0 Software Installation Guide Dated Jan. 22, 1998.

Mencke, C., "Finding the Lowest-Cost Path for Stock Trading," Investors Business Daily, May 1, 1996.

*Investment Technology Group Inc. et al* v. *Liquidnet Holdings, Inc.*; Southern District of New York, Civil Action No. 07 CIV 510 (GEUHP); Amended Complaint; dated Feb. 14, 2008.

Corcella, K., "Symphony Plays a Solo," Wall Street and Technology, Mar. 1995, vol. 12, n. 11, pp. 22-23.

*Investment Technology Group Inc. et al* v. *Liquidnet Holdings, Inc.*; Southern District of New York, Civil Action No. 07 CIV 510 (GEL/HP); Declaration of Michael A. Nicodema in Support of Liquidnet's Memorandum of Law in Opposition to the Declaratory Judgment Plaintiffs' Motion for Leave to Amend Their Complaint; Exhibits attached; dated Jan. 25, 2008.

*Investment Technology Group Inc. et al* v. *Liquidnet Holdings, Inc.*; Southern District of New York, Civil Action No. 07 CIV 510 (GEL/HP); Liquidnet Holdings, Inc.'s Answer to the Amended Complaint, Counterclaims and Affirmative Defenses, dated Feb. 29, 2008.

"India: No route in 3-day segment for negotiated deals: NSE." Businessline. Chennai: Sep. 5, 1999. p. 1 (2 pages).

Anonymous. "IBEX system links buyers to global business community." Purchasing. Boston: Oct. 5, 1995. vol. 119, Iss. 5; p. 23, 4 pgs.

*Investment Technology Group Inc. et al* v. *Liquidnet Holdings, Inc.*; Southern District of New York, Civil Action No. 07 CIV 510 (GEL/HP); Liquidnet Holdings, Inc.'s Amended Answer to the Amended Complaint, Counterclaims and Affirmative Defenses, dated Mar. 14, 2008.

*Investment Technology Group Inc. et al* v. *Liquidnet Holdings, Inc.*; Southern District of New York, Civil Action No. 1:07-cv-00510-GEL; Plaintiffs' Reply Memorandum of Law in Further Support of its Motion for Leave to Amend its Complaint to Add Additional Allegations to Existing Claims and to Add a Claim for Tortious Interference; dated Feb. 6, 2008.

Chapman, Peter; "The Relaunch of Harborside: Going Toe to Toe with Liquidnet"; TRADERSmagazine.com; http://www.tradersmagazine.com/issues/20011231/1117-1.htmrtyper-printer_friendly; Dec. 2001; printed Jan. 14, 2008.

Chapman, Peter; "Merrin's Solution to Liquidity Problem. A Better Mousetrap to Crush Market Impact?"; TRADERSmagazine.com; http://tradersmagazine.com/issues/20000930/23-1.html?type=printer_friendly; Sep. 2000 printed Jan. 14, 2008.

Harborside Links Demonstrate New Paradigm as Leading Order Management and Network Vendors Connect; Los Angeles (Business Wire) Jul. 12, 1999; http://findarticles.com/p/articles/mi_m0EIN/is_1999_July_12/ai_55150511/print; printed Nov. 7, 2007.

Oppenheim, E. "Electronic Trading Systems: Which. Why, Where," G-183, Business Co., Inc. Report, pp. 134-136.

Jefferies Launches @Harborside, May 11, 1999. Press Release. www.jefco.com.

Zhang, Q. et al., "A Framework or the Multi-agent System for Securities Businesses Support". The 54th speech papers (2) for a national convention, Japan, the Information Processing Society of Japan, Mar. 12, 1997, pp. 355-356.

Uchki, T., "Price Forming Simulation in Electrical Market", Research Paper of Information Processing Society, Japan, Information Processing Society of Japan, Nov. 7, 1995, vol. 95, No. 105, pp. 1-67.

* cited by examiner

| 410 | 412 | 414 | 416 | 418 | 420 | 422 | 424 | 426 | 428 | 430 |
|---|---|---|---|---|---|---|---|---|---|---|
| ORDER ID | TRADER ID | ORDER STATUS | ORDER LAST UPDATE TIME | TRANSACTION TYPE | SECURITY SYMBOL | SECURITY TYPE | ORDER TYPE | LIMIT PRICE | TOTAL ORDER SIZE | QUANTITY PLACED ELSEWHERE |

400

FIG. 4 ically transmit orders from the OMS's to the ETM and preferably update the OMS's in response to orders executed at the ETM. Traders can communicate with the ETM to anonymously negotiate trades of securities. As used herein, a "security" is an ownership or creditorship interest, such as a stock certificate, bond, or any other financial instrument, contract or transaction, such as a forward, futures, option, put, call, collar, swap, or currency contract on any security. This description uses the term "security" for convenience but it should be understood that the term covers financial instruments generally.

ELECTRONIC SECURITIES MARKETPLACE HAVING INTEGRATION WITH ORDER MANAGEMENT SYSTEMS

CROSS-REFERENCE TO RELATED APPLICATION

This divisional application claims the benefit of U.S. application Ser. No. 09/834,171 filed Apr. 12, 2001 now U.S. Pat. No. 7,136,834 and U.S. Provisional Application Ser. No. 60/242,373, filed Oct. 19, 2000 each of which is incorporated herein by reference in its entirety.

BACKGROUND

1. Field of the Invention

The present invention relates in general to securities trading and in particular to electronic commerce marketplaces and order management systems for supporting securities trading.

2. Background Art

Although computers are heavily used to facilitate trading of securities, manual intervention is still required at certain steps in the trading process. For example, most traders at institutional investment management firms record their orders to purchase or sell securities in computerized order management systems (OMS's). However, one or more traders at each firm must manually review the orders in the OMS and attempt to fill the orders by contacting one or more market intermediaries. Typically, the traders transmit the orders in the OMS by telephone or separate data entry links to registered broker-dealers for the securities, to electronic marketplaces that trade the securities, or to other market intermediaries. Accordingly, manual effort is required to actually execute the orders in the OMS.

One problem arising from this manual effort is that institutional traders cannot execute trades involving large quantities of securities without adversely affecting the market price of the securities. For example, institutional traders often need to trade large quantities of securities due to the continuing need of investment managers to respond to changes in market conditions by altering the contents of their investment portfolios. As these portfolios increase in size due to increased investor activity, the corresponding quantity of securities to be traded in order to achieve a similar portfolio balance also increases. Market impact costs, or adverse costs resulting from the institutional traders' activities, rise in such circumstances because locating parties with whom to trade such large quantities of securities becomes more difficult for the market intermediaries.

Moreover, if the market intermediaries become aware that an institutional firm wants to, say, sell a large block of a particular equity security, this awareness is likely to lower the sale price that the institutional firm can obtain due to the normal processes of supply and demand. The effect is also likely to be exacerbated by speculation from others with knowledge of the order as to why the particular investor wishes to sell such a large quantity of the security. Similarly, if market intermediaries become aware of the fact than an institutional firm wants to buy a large block of a particular equity security, this awareness will likely increase the purchase price that the institutional firm will have to pay. This adverse effect on price is further exacerbated by the fact that traditional market intermediaries trade for their own accounts.

One strategy commonly employed by institutional traders to offset market impact costs is to spread out trade orders for a large quantity of a security into small orders each handled by a different market intermediary, sometimes over several trading days. Of course, this strategy brings about its own problems in that the market price can change significantly during this extended trading period due to the unforeseeable activities of others.

Another strategy that may be employed is to spread the orders for the security among one or more electronic marketplaces. However, the traders must manually transmit each order to the electronic marketplaces using a telephone or a separate data entry link. The fact that the traders need to perform these extra steps, which include duplicate entry of basic order data already recorded in the OMS, causes many traders to use these electronic marketplaces infrequently, and to supply the marketplaces with only a small subset of the total orders. As a result, these electronic marketplaces often lack the liquidity required by a trader to timely execute orders.

The lack of integration between the OMS and the electronic marketplaces also poses problems when an institutional trader wishes to trade a particular security simultaneously within an electronic marketplace and, for example, over the telephone with a traditional broker. For example, some electronic marketplaces attempt to find matches at only specific time intervals. If a trader wishes to buy 100,000 shares of IBM, and has placed an order for half that amount in an electronic marketplace, the trader will not know how much, if any, IBM stock was purchased until after the next scheduled match attempt. In the meantime, the trader potentially could have purchased more than 50,000 shares from a broker over the phone at a better price.

Therefore, there is a need in the art for an electronic trading marketplace that does not require any manual intervention by traders or other parties, offers anonymity, and offers a high amount of liquidity.

DISCLOSURE OF THE INVENTION

The present invention addresses the above need by providing for the automated transmission of orders (i.e., without manual trader intervention) from the various order management systems (OMS's) used by investment management firms or other entities having trading systems to an electronic trading marketplace (ETM). A firm with a trading system stores information about orders in an OMS to manage its order flow, to monitor the initiation, placement, and execution of orders, and for related purposes. Software providing the functionality of an OMS is well known in the art.

OMS interfacing modules (OIMs) at the firms automatically transmit orders from the OMS's to the ETM and preferably update the OMS's in response to orders executed at the ETM. Traders can communicate with the ETM to anonymously negotiate trades of securities. As used herein, a "security" is an ownership or creditorship interest, such as a stock certificate, bond, or any other financial instrument, contract or transaction, such as a forward, futures, option, put, call, collar, swap, or currency contract on any security. This description uses the term "security" for convenience but it should be understood that the term covers financial instruments generally.

The ETM includes an OMS data integration module (ODIM) for receiving and processing data representative of orders received from the OIMs. In a preferred embodiment, the data from the OIMs are provided to the ETM in a standardized format that requires little processing by the ODIM. The orders processed by the ODIM are stored in an ETM database.

A negotiation module in the ETM supports negotiations between traders. In one embodiment, an indications module transmits orders received by the ETM among the traders based upon filtering criteria established by the traders and/or the ETM. These orders are transmitted among the traders in the form of non-binding indications. Based upon these indications, traders at one institution can enter into negotiations with traders at other institutions, through the negotiation module of the ETM. In one embodiment, at least parts of the negotiations are conducted anonymously.

A trader authentication module authorizes and authenticates traders who log into the ETM in order to perform trading negotiations and/or other functions. A transaction history module records transactions performed by the ETM in the ETM database. The transaction history module also preferably records other data processed by the ETM including, for example, the orders received from and sent to the trading systems and the conducted negotiations.

A typical trading system at an investment management firm or other entity at which trading is performed includes a number of workstations coupled to an OMS server via a network, with a trader at each workstation. Each workstation preferably executes a trader OMS interaction module (TOIM) for facilitating interactions between the trader's workstation and the OMS server. In one embodiment of the present invention, the TOIM allows a trader to add, delete, or modify open or contemplated orders stored in the OMS database. The OMS, which includes the OMS server, OMS database, and TOIM, is typically provided by an OMS vendor, though some firms have developed their own OMS's.

In connection with the present invention, each workstation also preferably executes an ETM interaction module (EIM) for facilitating interactions with the ETM. The EIM allows a trader to send information to the ETM and view and respond to information received from the ETM. Typically, this information includes information about the trader's indications, information about other traders' indications, and orders transmitted to and received by a trader during a negotiation.

The OMS database holds data representative of open, contemplated, or completed orders to buy and/or sell securities by traders using the trading system. The OIM is in communication with the OMS database and the ETM. An OMS database integration module in the OIM reads data records stored in the OMS database and, in a preferred embodiment, also creates and modifies data records stored in the OMS database upon execution of a trade through the ETM. In one embodiment, the OMS database interaction module directly accesses the OMS database and in another embodiment it sends commands to an application programming interface (API) in the OMS for accessing the database.

The OIM also includes an ETM communication module for communicating with the ETM. In one embodiment, the ETM communication module provides selected data records in the OMS database to the ETM and, in a preferred embodiment, receives data and/or instructions from the ETM regarding changes to make to the OMS database. In addition, the OIM preferably includes a data record conversion module for modifying the format of data records sent to the ETM and/or received from the ETM. The OIM also preferably includes a filtering module for filtering out specified orders by security type, security name, order type, order price, order quantity, or other category, so that those orders are not transmitted to the ETM.

Preferably, the OIM transmits to the ETM data records in the OMS database relating to a trader's orders when the trader logs on to the ETM. Once the OIM determines that the trader has logged on to the ETM, the DIM retrieves data records about that trader's orders suitable for transmission to the ETM from the OMS database. In one embodiment, the OIM converts the data records retrieved from the OMS database into a standardized format understood by the ETM. In another embodiment, this functionality is part of the ETM.

After a trader has logged on to the ETM, the OIM determines whether the contents of the OMS database have changed. If the OMS database has changed, the OIM determines whether the change should be transmitted to the ETM. In one embodiment, the OIM continues to determine whether the contents of the OMS database have changed between the time that a trader logs on to the ETM and the time that the ETM commences trading. In another embodiment, the OIM does not commence making this determination until the time that the ETM commences trading.

Because typical OMS's are complex and multi-featured, and because securities of types not handled by the ETM may be traded using the OMS, some changes to the OMS database do not necessitate a transmission of updated data to the ETM. The OIM preferably transmits changes to the database to the ETM if the changes represent new or modified orders.

The OIM preferably updates the database in response to information received from the ETM indicating executed trades or other information. In a preferred embodiment, if an execution occurred in the ETM involving an order in the OMS associated with the OIM, the OIM receives information from the ETM describing the execution. This information includes, for example, the type, amount, and price of securities traded, the time of execution, and/or information identifying the original order in the OMS database on which the execution was based. The OIM converts the received information about the execution into the format used by the OMS and updates the OMS database accordingly. As a result of these steps, the OMS is updated automatically and transparently to reflect executions performed at the ETM. The executions appear to the OMS as typical trades conducted at another broker, so no special functionality needs to be added to the OMS in order to interact with the ETM beyond that functionality described herein.

BRIEF DESCRIPTION OF THE DRAWINGS

FIG. 4 is a diagram illustrating a data record stored in the order management system (OMS) database to identify an order according to one embodiment of the present invention;

DETAILED DESCRIPTION OF THE PREFERRED EMBODIMENTS

Figure 1:
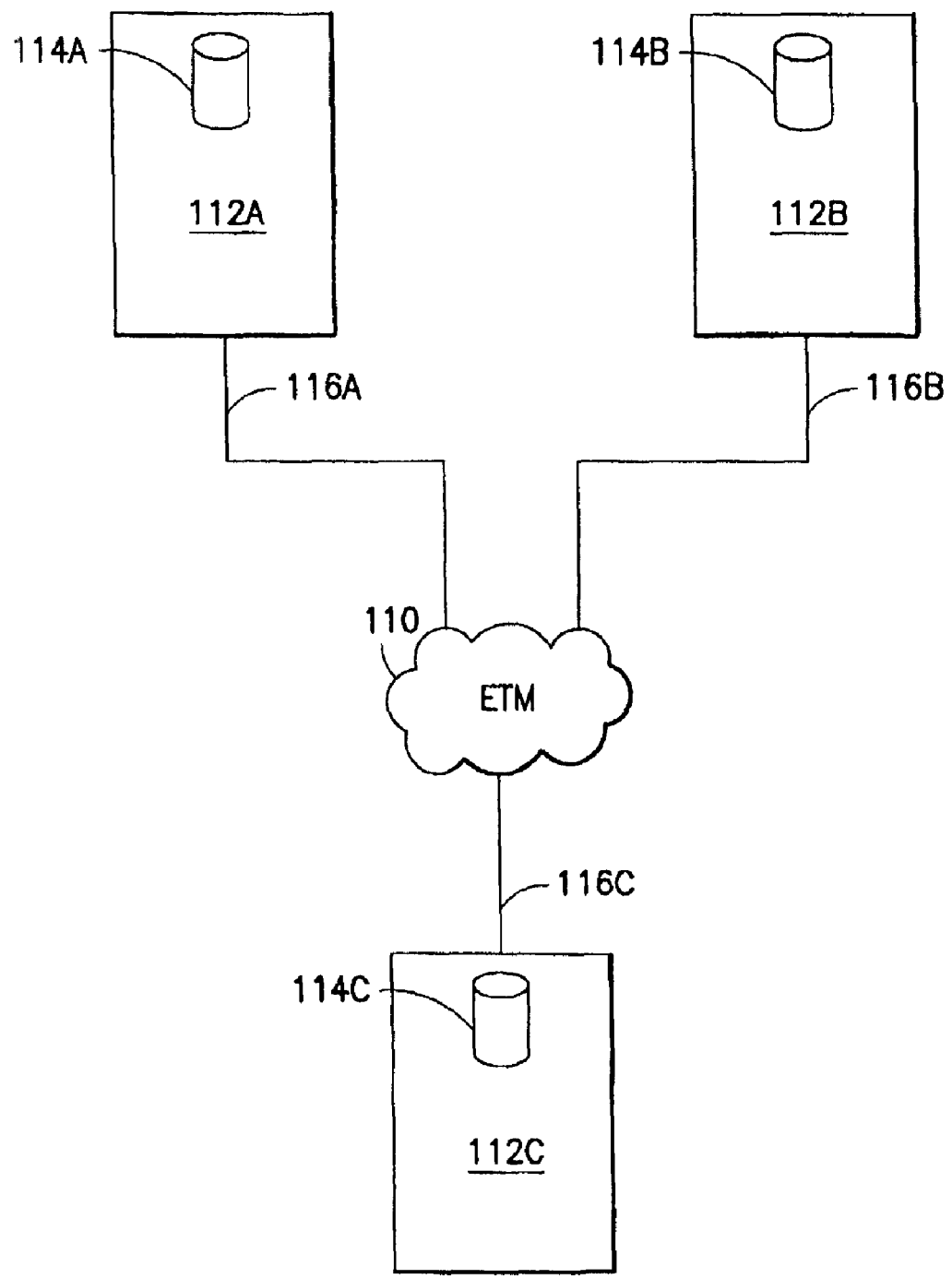
FIG. 1 is a high-level block diagram illustrating an electronic trading marketplace (ETM) environment according to an embodiment of the present invention.

FIG. 1 is a high-level block diagram illustrating an electronic trading marketplace (ETM) environment according to an embodiment of the present invention. An ETM 110 is in communication with three trading systems 112A, 112B, 112C. Although only three trading systems 112 are illustrated, embodiments of the present invention can have many more (or fewer) trading systems 112 in communication with the ETM 110. FIG. 1 illustrates only three trading systems 112 in order to enhance the clarity of this description.

The trading systems are used by investment management firms or other entities that have established a relationship with the ETM 110. The trading systems 112 communicate with the ETM 110 to facilitate the trading of securities. As used herein, a "security" is any ownership or creditorship interest, such as a stock certificate or bond, or any other financial instrument, contract, or transaction, such as a forward, futures, option, put, call, collar, swap, or currency contract. This definition includes, for example, any note, stock, bond, debenture, certificate of interest or participation in any profit-sharing agreement or in any oil, gas, or other mineral royalty or lease, any collateral trust certificate, investment contract, voting-trust certificate, certificate of deposit, any put, call, straddle, option, or privilege on any of the foregoing, or group or index of securities (including any interest therein or based on the value thereof). This list is not all-inclusive. For purposes of clarity, this description will describe the trading of stock.

Within each trading system 112 is a database 114A, 114B, 114C associated with an order management system (OMS). Each OMS database 114 holds data representative of open, contemplated, or completed orders to buy and/or sell securities (collectively referred to herein as "orders for securities") by traders using the trading system 112. For example, assume that the database 114A of trading system 112A contains orders to sell 50,000 shares of DELL and 75,000 shares of MSFT and orders to buy 25,000 shares of CPQ and 100,000 shares of IBM. Also assume that the database 114B of trading system 112B contains orders to sell 30,000 shares of CPQ and buy 62,000 shares of T.

The orders in the OMS databases 114 are automatically transmitted to the ETM 110. Likewise, any changes in the orders, such as modifications and/or withdrawals, are automatically transmitted to the ETM 110. As used herein, the term "automatically" means that the associated action is performed without any human or manual intervention. Thus, there is no need for traders to specifically request that individual orders in the OMS databases 114 are transmitted to the ETM 110; orders in the databases are sent to the ETM 110 without the traders' input (subject to filtering criteria).

Preferably, the ETM 110 anonymously transmits information about a trader's orders to other traders using the ETM, subject to filtering in accordance with filtering criteria established by the traders and/or the ETM. Moreover, the ETM 110 preferably manages anonymous negotiations between traders using the trading systems 112 for the purpose of executing the orders and sends data about the completed trades to the OMS's of the traders involved in the transaction.

Thus, one embodiment of the present invention selectively broadcasts information about the orders received by the ETM 110 from the database 114A of trading system 112A to the other trading systems 112B, 112C. Likewise, the ETM 110 selectively broadcasts information about the orders received from the database 114B of trading system 112B to the other trading systems 112A, 112C. If the traders desire such a trade, the ETM 110 will facilitate the anonymous negotiation and sale of 25,000 shares of CPQ from a trader using trading system 112B to a trader using trading system 112A.

Data is communicated between the trading systems 112 and the ETM 110 using interfacing links 116A, 116B, 116C. Any known interfacing technologies can be used to effectuate these links, including, but not limited to, transmission control protocol/Internet protocol (TCP/IP), satellite, cellular, and/or radio frequency (RF) links, or some combination thereof. The links may pass through one or more intermediate data processing systems, such as telephone switches or Internet servers, before reaching the ETM 110 or a trading system 112. In embodiments where data travels over shared links, such as embodiments where data travels over the public Internet, the data is preferably encrypted using a secure protocol, such as the secure sockets layer (SSL).

Figure 2:
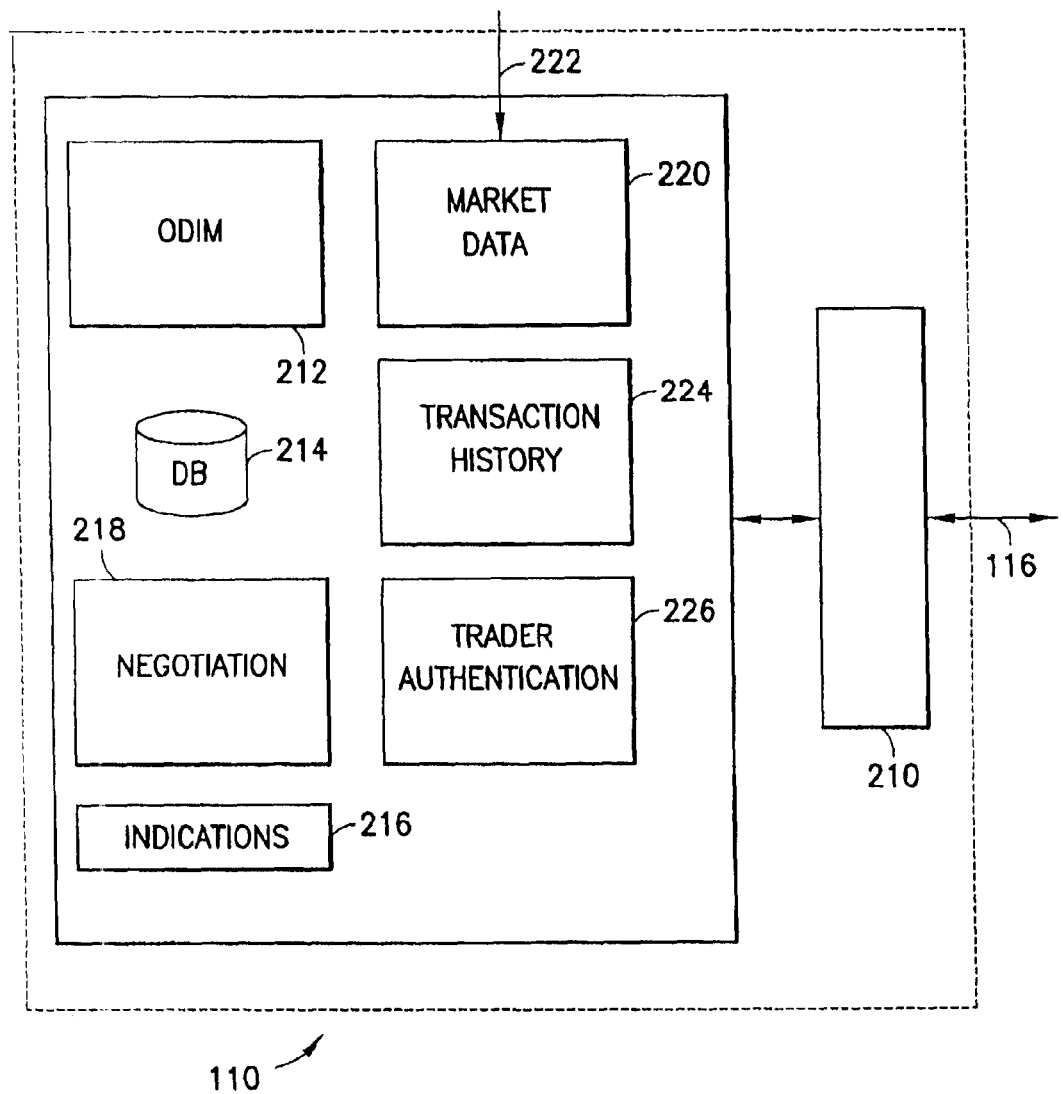
FIG. 2 is a high-level block diagram illustrating more details of the ETM.

FIG. 2 is a high-level block diagram illustrating more details of the ETM 110. Those of skill in the art will recognize that FIG. 2 illustrates only one possible embodiment of the ETM 110. Obviously, different combinations of hardware and software can be used to provide the functionality of the ETM 110 described herein.

Data received by the ETM 110 from the trading systems 112 over the interfacing links 116 are received by a firewall 210. As is known in the art, the firewall 210 preferably prevents unauthorized users from gaining access to the rest of the ETM 110 and monitors transfers of data to and from the network.

Data that pass through the firewall 210 are received by one or more modules that perform the functionality of the ETM 110. As used herein, the term "module" refers to machine-executable code and/or data, but may also include associated circuitry, such as processing circuitry, as well as data storage areas, and/or any other software or hardware. Thus, it will be appreciated that one or a combination of hardware and software, such as a computer system executing software for performing the functionality of the modules, may implement each of the modules shown in FIG. 2. It will also be appreciated by those skilled in the art that the ETM 110 may comprise one or more other types of modules, circuitry, etc., not shown in FIG. 2 in order to avoid unnecessarily obscuring, understanding of the invention. For instance, the ETM 110 may include one or more microprocessors, network connection circuitry, and/or data storage areas, such as read-only memory (ROM), random-access memory (RAM), CDROM, DVD, tape drive, hard disk (HD), and/or other types of storage areas. It will also be appreciated that the functionality of multiple modules described herein can be combined into a single module and the functionality of a single module can be split or shared among multiple modules. Moreover, alternative embodiments of the present invention can lack one or more of the modules described herein and/or have modules not described herein.

The ETM 110 preferably includes an OMS data integration module (ODIM) 212. The ODIM 212 receives and processes data representative of orders received from the OMS databases 114 in the trading systems 112. In a preferred embodiment, the data from the OMS databases 114 are provided to the ETM 110 in a standardized format that requires little processing by the ODIM 212. In an alternative embodiment, the data from the OMS databases 114 are provided to the ETM 110 in one or more different formats depending upon factors such as the type of OMS used by the trading systems 112, the types of interfacing links supplying the data to the ETM, the type of security or orders to which the data pertains, and the like. In this latter embodiment, the ODIM 212 preferably converts the data into a standardized format for use by other modules in the ETM 110.

The orders processed by the ODIM 212 are stored in an ETM database 214. Data in the database 214 are preferably accessible to the other modules in the ETM 110. In addition, the other modules in the ETM 110 can store other data in the illustrated database 214 or other databases as may be required during normal operation.

In a preferred embodiment, an indications module 216 transmits information about orders received by the ETM 110 among the various traders based upon filtering criteria established by the traders and/or the ETM. This information is transmitted among the traders in the form of non-binding indications.

Based upon these indications, traders can enter into negotiations with other traders through a negotiation module 218. The negotiation module 218 facilitates negotiations between traders using trading systems and having contra interests. In one embodiment, at least parts of the negotiations are conducted anonymously, in order to limit the spread of information about the traders' activities.

A market data module 220 receives real-time and other market data from an input 222. The market data module 220 provides the market data to the negotiation module 218 and to the traders. The traders preferably use the market data during the negotiations to determining market prices for the securities.

A transaction history module 224 records transactions performed by the ETM 110 in the database 214. The transaction history module 224 also preferably records other data processed by the ETM 110 including, for example, information about orders received from and sent to the trading systems 112 and the negotiations conducted (successful or not). This module 224 is preferably used to audit the transactions conducted on the ETM 110.

A trader authentication module 226 authorizes and authenticates traders who log into the ETM 110 in order to perform trading negotiations and/or other functions. In one embodiment, the trader authentication module 226 stores authentication information, such as a login ID/password pair in the database 214. The trader authentication module 226 also preferably stores profiles for the registered traders.

Other modules that may be present in the ETM 110 include load monitoring modules for monitoring the load on various servers comprising the ETM, fault tolerance modules for providing fault tolerance to the ETM, security modules for preventing and detecting security violations on the ETM, and back office modules for providing back office functionality. These modules are not shown in FIG. 2 in order to avoid unnecessarily complicating the figure.

Figure 3:
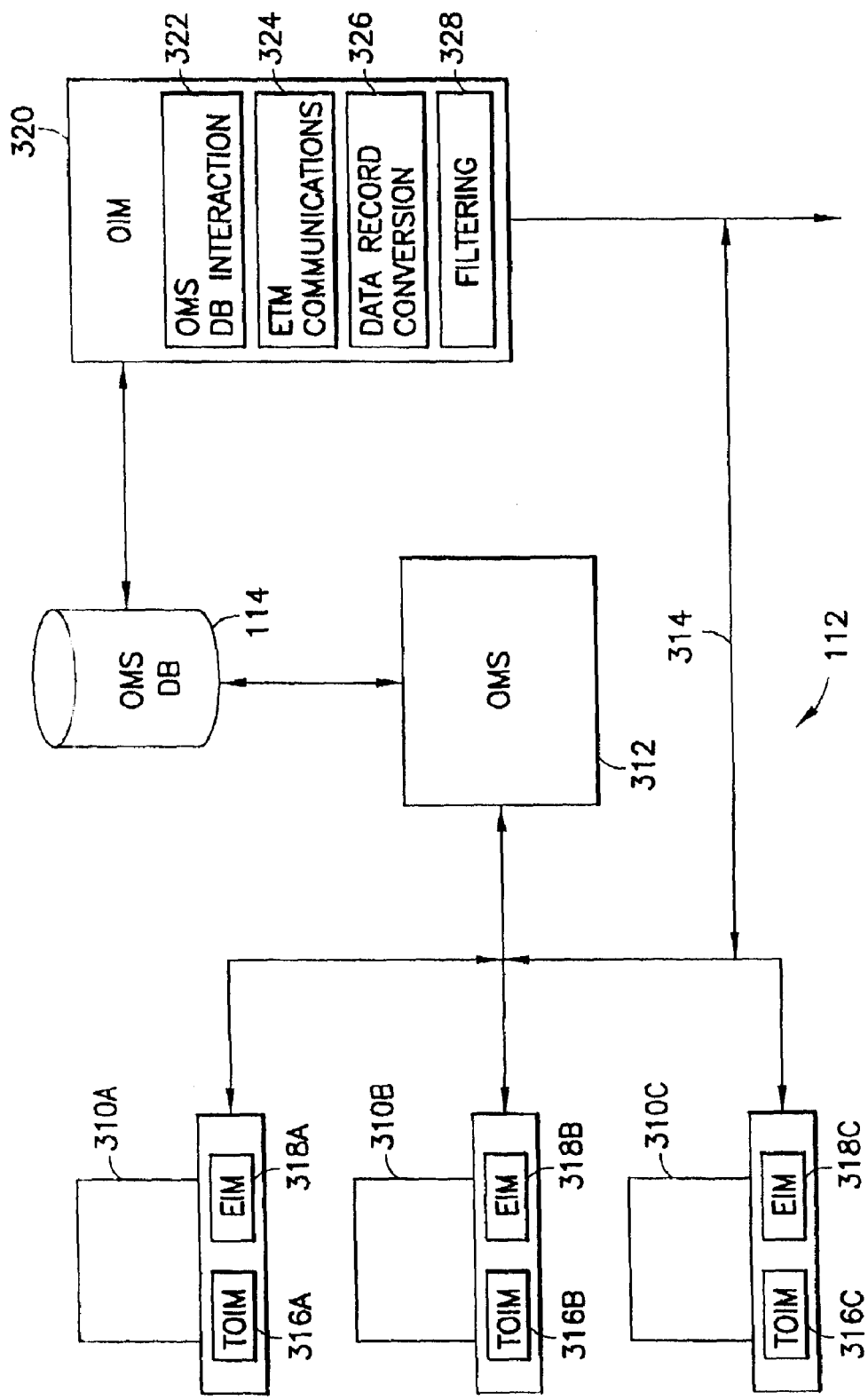
FIG. 3 is a lower-level block diagram illustrating a trading system like those illustrated in FIG. 1.

FIG. 3 is a lower-level block diagram illustrating a trading system 112 like those illustrated in FIG. 1. Those of ordinary skill in the art will recognize that FIG. 3 illustrates only one possible embodiment of a trading system 112 and alternative embodiments of the trading system exist. FIG. 3 illustrates three workstations 310A, 310B, 310C coupled to an OMS server 312 via a network 314. The workstations 310 are preferably general- or specific-purpose computer systems executing specialized software for facilitating trading of securities. Although only three workstations 310 are illustrated, a trading system 112 can have any practical number of workstations.

In a typical trading system that interacts with the ETM 110, each workstation 310 executes a trader OMS interaction module 316 (TOIM) for facilitating interactions with the OMS server 312. In this typical trading system, the TOIM 316 allows a trader to add, delete, or modify open or contemplated orders stored in the OMS database 114. Contemplated orders may be stored in the OMS database 114, for example, because the trader intends to execute certain transactions in stages, or because the contemplated transactions are desirable only if the market prices of the securities to be traded are within a certain range (e.g., limit orders). Therefore, such orders serve as placeholders indicating the total quantity of a security that a trader wishes to transact and conditions for transacting other orders; other data in the database 114 indicate the quantity of the security that has been transacted to date.

Each workstation 310 executes an ETM interaction module 318 (EIM) for facilitating interactions with the ETM 110. In alternative embodiments of the present invention, the EIM 318 is incorporated into the TOIM 316 or other modules on the workstation 310. The EIM 318 allows a trader to send information to the ETM 110 and view and respond to information received from the ETM 110. Typically, the received information includes information about orders (through the indications module 216) and orders (through the negotiation module 218) that the ETM 110 receives from other traders or trading institutions. The trader uses the EIM 318 to enter into and transact negotiations to buy and/or sell securities through the ETM 110.

The network 314 connects the workstations 310 to the OMS 312 and to external networks such as the network in communication with the ETM 110. The network 314 can utilize any networking technology that supports bi-directional transfer of data among the OMS 312, workstations 310, and external networks. In a typical embodiment, the network 314 is a private local area network (LAN) installed at a financial institution and interfacing with one or more external gateways. In alternate embodiments, the network may be wireless, connect devices over a wide area, and/or at least partially carry data over a public network (such as the Internet). Other network components, such as a firewall, may also be present. Those of ordinary skill in the art will recognize that many different types of networks can perform the functionality described herein.

The OMS 312 is preferably comprised of one or more computer systems for executing and maintaining an order management system. The OMS 312 receives instructions from the workstations to create, modify, and/or delete orders and updates the database 114 accordingly. Software providing the functionality of the OMS 312 is well known in the art. Commercial OMS software packages are available from The MacGregor Group, Eze Castle Software, Advent Software, and Decalog, to name but a few. In addition, some trading institutions utilize custom OMS software.

As described above, the database 114 holds data representative of open, contemplated, or completed orders to buy and/or sell securities. FIG. 4 is a diagram illustrating a data record 400 stored in the database 114 to identify an order according to one embodiment of the present invention. Different OMS systems utilize different order data records and, therefore, it should be understood that FIG. 4 illustrates only one possible data record. However, many OMS systems store the same general information and the illustrated order data record 400 is intended to represent a typical order data record for an OMS system.

The order data record 400 has multiple fields, each field holding different information about an order. The Order ID field 410 preferably holds a value uniquely identifying the order associated with the data record 400. Similarly, the Trader ID field 412 preferably holds a value uniquely identifying the trader or other person who placed the order. The Order Status field 414 identifies whether the order is open, contemplated, completed, canceled, or any other possible status. The next field, Order Last Update Time 416, preferably holds a timestamp that identifies the last time that the data record 400 was modified in any way. This field 416 is useful for determining whether the most recent version of the data record 400 has been considered.

The Transaction Type field 418 preferably indicates whether the data record 400 corresponds to an order to buy or sell a security. The Security Symbol field 420 preferably uniquely identifies the security to be transacted. The Security Symbol field 420 can hold, for example, a Committee on Uniform Securities Identification Procedures (CUSIP) number, a ticker symbol, or any other identifier of the security. The Security Type field 422 is preferably used to interpret the other data in the data record 400 according to the given security type. For example, treasury bills are priced in terms of a discount to face value; inherent in the pricing formula is the yield that would be obtained if the bill were held to maturity. In contrast, equity securities are priced in actual per-share values. The information in the Security Type field 422 can also be used to filter out certain types of securities.

The Order Type field 424 preferably indicates whether the order is a market or a limit order, although the field can also indicate other order types. If the order is a limit order, the Limit Price Field 426 preferably identifies the price set by the trader.

The Total Order Size field 428 preferably identifies the actual number of shares that the trader desires to transact. The Quantity Placed Elsewhere field 430 is a value either equal to or less than the value in the Total Order Size field 428. In an embodiment of the present invention, the ETM 110 uses the values of these two fields 428, 430 determine a quantity of a security, if any, that are available to be transacted by the ETM.

Preferably, the OMS 312 allows for the possibility that trading a large quantity of a given security may occur over several days at several different venues. For example, to fill an order to buy 1,000,000 shares of IBM, a trader may need to place an order for 300,000 shares with one broker, and record numerous executions of portions thereof until the full 300,000 shares placed with that broker are purchased. If the broker cannot provide additional shares at a suitable price, the trader may then place an additional quantity, up to the 700,000 shares remaining to be purchased, via another broker, electronic marketplace, or other venue. Preferably, the broker enters a placement record into the OMS database 114 to indicate that the trader anticipates executing a portion of the order through the second venue. This second venue may also fill the quantity it was asked to provide in several executions. Thus, an order can have one or more placements and each placement can have one or more executions associated with it.

Figure 5:
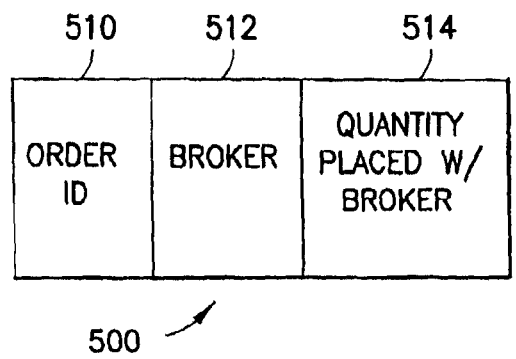
FIG. 5 is a diagram illustrating a placement record preferably stored in the OMS database to indicate a placement of an order at a particular venue.

FIG. 5 is a diagram illustrating a placement record 500 preferably stored in the OMS database 114 to indicate a placement of an order at a particular venue. The Order ID field 510 preferably holds a value that uniquely identifies the order associated with the placement. The Order ID field 510 ties the placement information to the overall order. Thus, all placements for the same order preferably have the same value in this field 510. The Broker field 512 preferably contains an alphanumeric value identifying the venue associated with the placement record. Lastly, the Quantity Placed with Broker field 514 preferably lists the portion of the total order size that is placed for fulfillment through the venue.

Figure 6:
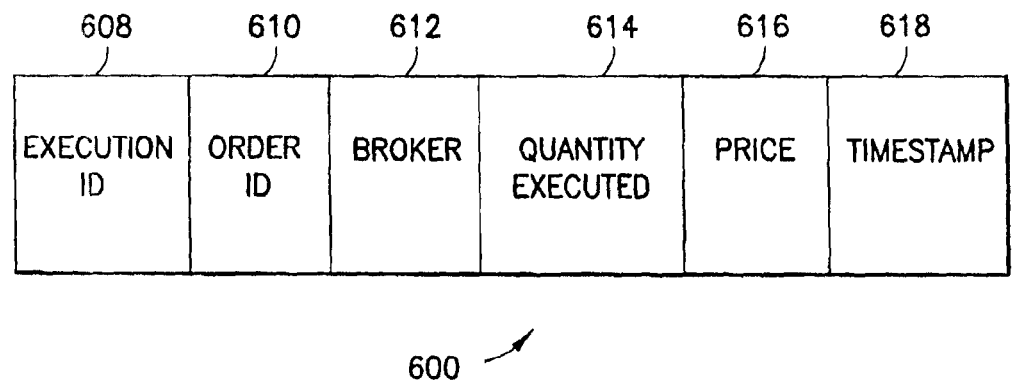
FIG. 6 is a diagram illustrating an execution record preferably stored in the OMS database to indicate the execution of an order.

When a transaction is executed in a specified venue, such as the ETM 110, a corresponding execution record is preferably stored in the OMS database 114. FIG. 6 is a diagram illustrating an execution record 600 according to an embodiment of the present invention. An execution ID field 608 preferably holds a value identifying the particular execution. As before, the Order ID field 610 preferably holds a value that uniquely identifies the order associated with the execution and all executions for the same order preferably have the same value in this field 610. The Broker field 612 preferably contains an alphanumeric value identifying the venue that performed the execution. The Quantity Executed field 614 preferably specifies the number of securities transacted in this execution while the Price field 616 specifies the price at which the securities were executed. The Timestamp field 618 preferably records the time at which the execution took place.

The OMS interfacing module (OIM) 320 is in communication with the OMS database 114 via the network 314 or a direct connection. In alternative embodiments, the OIM 320 is in communication with the OMS 312 and/or the workstations 310. The OIM 320 is also in communication with the ETM 110 via an external gateway or some other form of network connection. In another alternative embodiment, the OIM 320 is integrated into the ETM 110 and is remote from the OMS 312, although some functionality is present at the OMS in order to provide OMS data to the OIM.

In a preferred embodiment, the OIM 320 includes a computer system storing and executing software for performing the functionality described herein. In an alternative embodiment, the OIM 320 executes on the same computer system as the OMS 312. In one embodiment, the OIM 320 includes an OMS database interaction module 322 for interacting with the OMS database 114. The OMS database interaction module 322 reads records stored in the OMS database 114 and, in a preferred embodiment, creates and modifies data records stored in the OMS database 114. In one embodiment, the OMS database interaction module 322 directly accesses the OMS database 114 and in another embodiment it sends commands to an applications programming interface (API) in the OMS 312 for accessing the database.

The OIM 320 also preferably includes an ETM communication module 324 for communicating with the ETM 110. In one embodiment, the ETM communication module 324 automatically provides selected data records in the OMS database 114 to the ETM 110 and, in a preferred embodiment, receives data and/or instructions from the ETM. In addition, the OIM 320 also preferably includes a data record conversion module 326 for modifying the format of the data records sent to and/or received from the ETM 110 and a filtering module 238 for filtering out specified orders by security type, security name, order type, order quantity, order price, or some other factor or category, so that filtered orders are not transmitted to the ETM.

Figure 7:
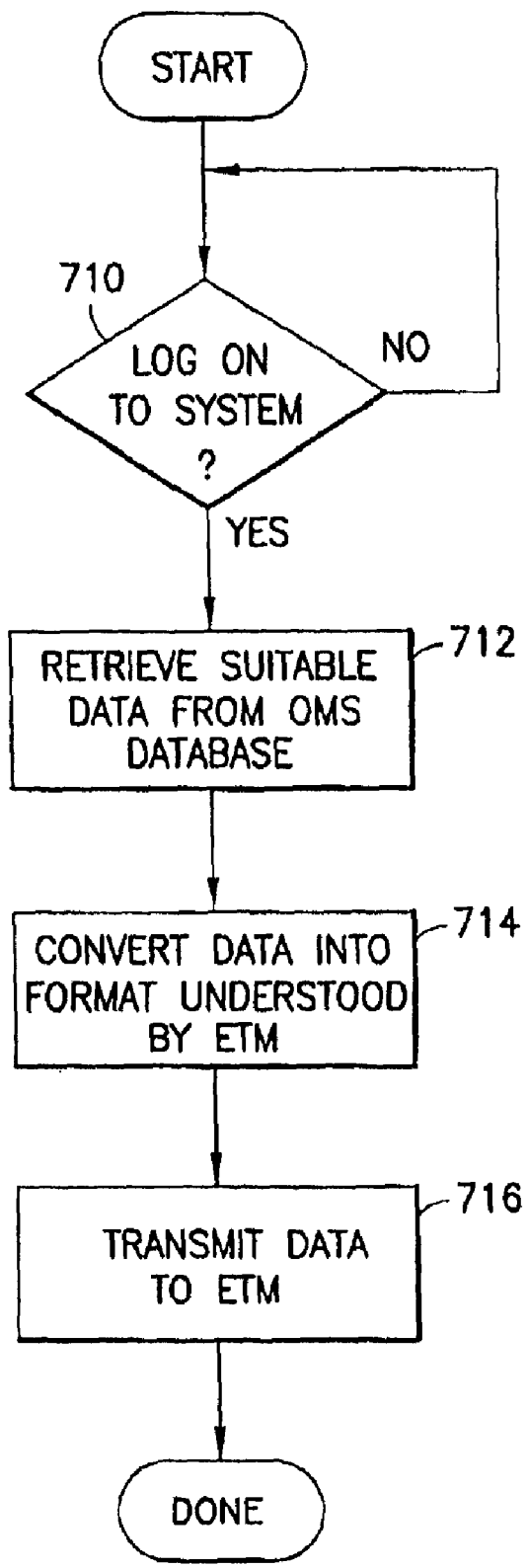
FIG. 7 is a flow diagram illustrating actions performed by an embodiment of the present invention when a trader logs on to the ETM.

FIG. 7 is a flow diagram illustrating actions performed by an embodiment of the present invention when a trader logs on to the ETM 110. Although the actions of FIG. 7 and subsequent figures are attributed herein to the OIM 320, one of ordinary skill in the art will recognize that all or some of the actions can be carried out by other entities.

Preferably, the OIM 320 waits 710 until a trader logs on to the OMS 312 before transmitting data records for that trader to the ETM 110. In one embodiment, the ETM 110 sends a message to the OIM 320 when a trader at the institution in which the OIM 320 resides logs into the ETM. The OIM 320 interprets this message as a sign to commence receiving orders. In other embodiments of the present invention, the OIM 320 uses other techniques, such as querying the OMS database 114 for specific entries, listening for an inter-process message sent by the OMS 312, polling individual trader workstations 310, or implementing a timer-based algorithm, to determine that a trader has logged on to the OMS 312.

Once a determination 710 is made that a trader has logged on to the OMS 312 the OIM 320 retrieves 712 data records about orders suitable for transmission to the ETM from the OMS database 114. In one embodiment of the present invention, all open orders are suitable for transmission to the ETM 110. In other embodiments of the present invention, the OIM 320, through the filtering module 328, makes the determination of suitable orders based on other criteria, such as the security type (e.g., stock or bond), security name (e.g., IBM or T), order type (e.g., market or limit order), order quantity, and/or order price.

If necessary, the data record conversion module 326 within the OIM 320 preferably converts 714 the data records retrieved from the OMS database 114 into a standardized format understood by the ETM 110. As described above, the functionality of the data record conversion module 326 can also be performed by the ODIM 212 in the ETM 110. Alternative embodiments of the present invention may send the data records individually or in multiple batches. The data transmitted to the ETM 110 depend on factors such as the types of securities being traded, and/or the fields required in order to accurately trade such securities.

Figure 8:
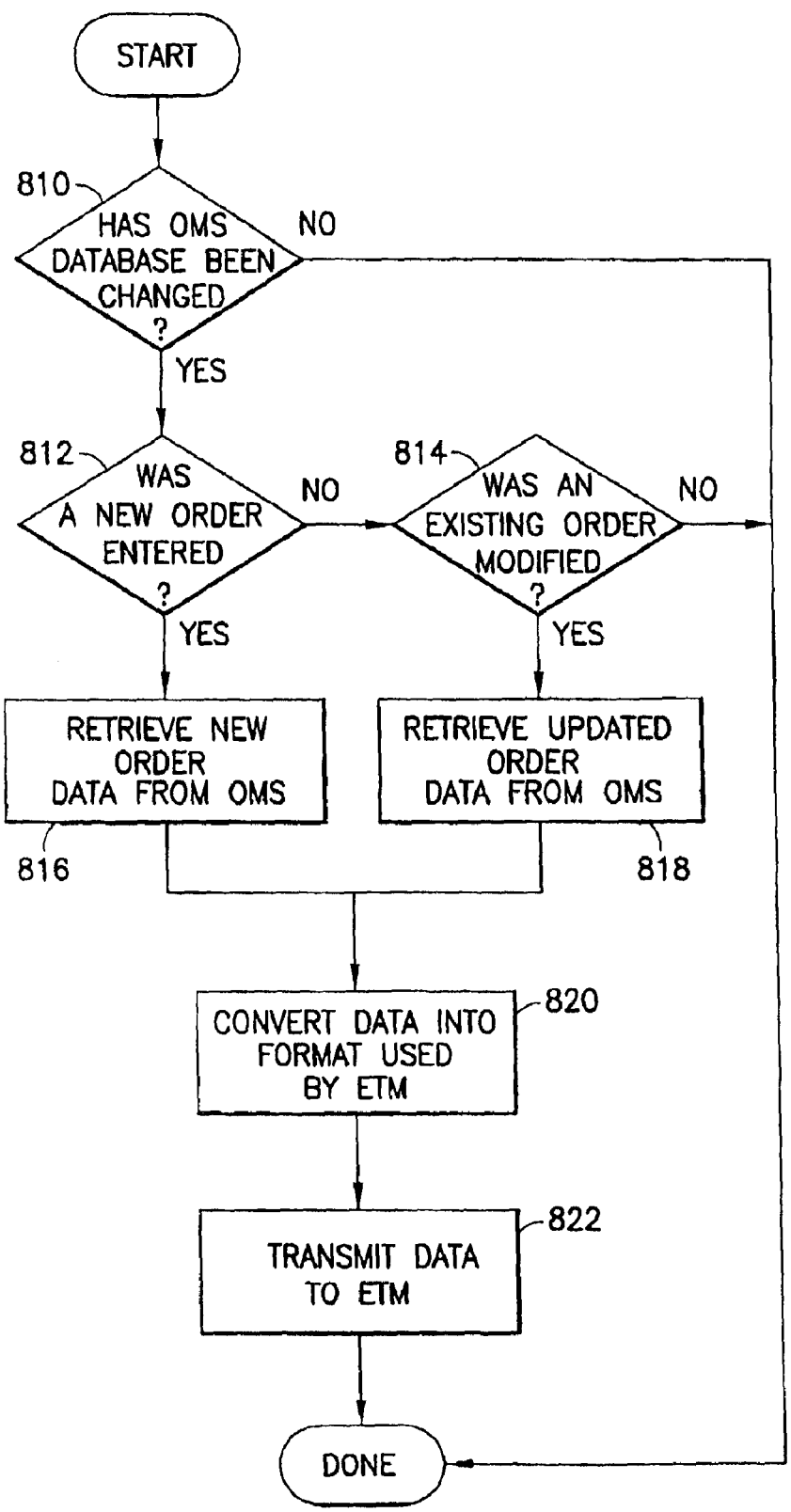
FIG. 8 is a flow diagram illustrating actions performed by an embodiment of the present invention after a trader has logged on to the ETM.

FIG. 8 is a flow diagram illustrating the actions performed by an embodiment of the present invention after a trader has logged on to the OMS during the trading day. The actions of FIG. 8 are preferably automatically performed multiple times during the trading day. Initially, the OIM 320 determines 810 whether the contents of the OMS database 114 have changed. The OIM 320 can perform this step by, for example, polling the database 114 at regular, near-real-time intervals, querying the database for contents of specified fields such as timestamps, and/or listening for network or specific interprocess communication message traffic.

If the database has changed, the OIM 320 preferably determines whether the change should be transmitted to the ETM 110. Because typical OMS's are complex and multi-featured, and because securities of types not handled by the ETM 110 may be traded using the OMS 312, some changes to the OMS database 114 do not necessitate a transmission of updated data to the ETM 110. Thus, the OIM 320 determines 812 whether the change to the database 114 reflects a new order of a type that is traded in the ETM 110. If so, then the OIM 320 retrieves 816 the pertinent data for the order from the database 114. If the change does not reflect a new order, then the OIM 320 preferably determines 814 whether the database change pertains to a modification of an existing order that has already been sent to the ETM 110. If so, the OIM 320 retrieves 818 the data records corresponding to the modified order from the database 114. Once the appropriate data records, if any, are retrieved from the database, the OIM 320 preferably converts 820 the data records into the appropriate format and transmits the records to the ETM 110 as described above with respect to FIG. 7.

Figure 9:
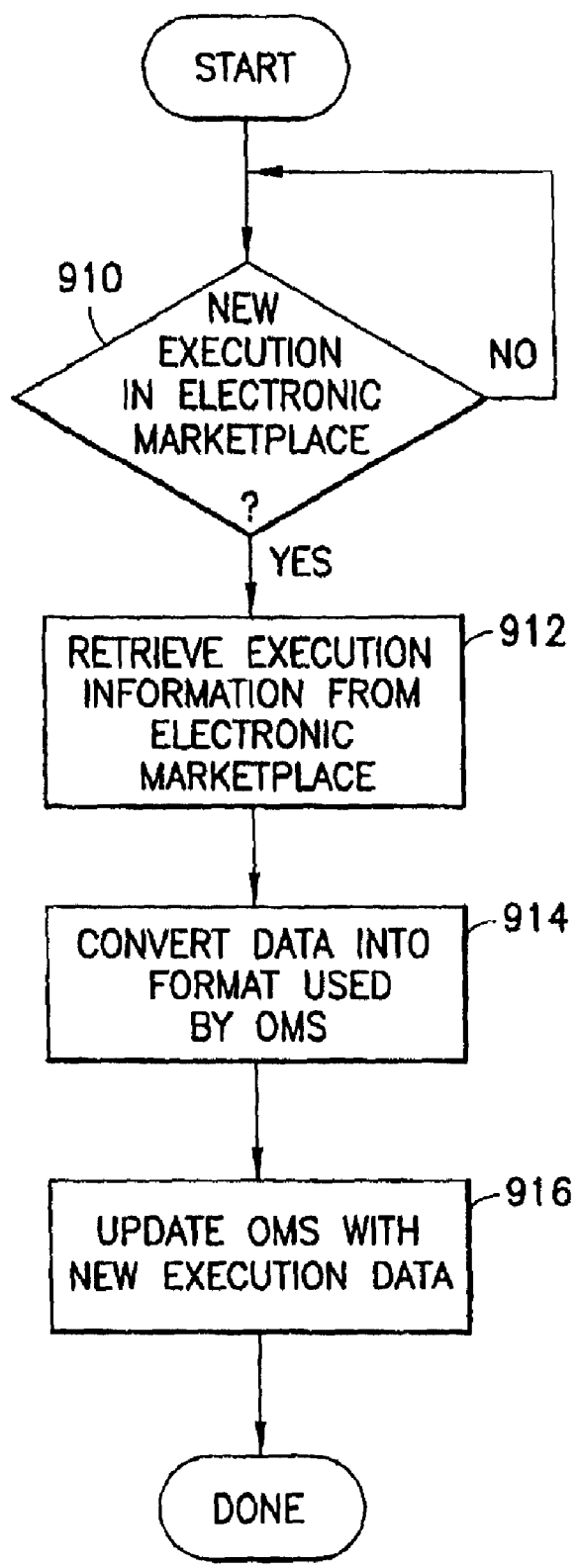
FIG. 9 is a flow diagram illustrating actions performed by a preferred embodiment of the present invention when the OMS database is updated in response to a trade executed by the ETM.

FIG. 9 is a flow diagram illustrating the actions performed by an embodiment of the present invention when the OMS database 114 is updated in response to a trade executed by the ETM 110. The illustrated steps can be performed each time a trade is executed, or in batch. However, the steps are preferably performed frequently enough so that the OMS database 114 is updated in substantially real-time.

The OIM 320 initially determines 910 whether an execution occurred in the ETM 110 involving an order in the OMS 312 associated with the OIM. The step may be performed, for example, by receiving a message from the ETM 110 identifying a particular execution that occurred at the ETM, by filtering a list of all executions or other data from the ETM for executions listed in the OMS 312, or by periodically polling the ETM for performed executions.

If an execution occurred in the ETM 110 involving an order in the OMS 312 associated with the OIM 320, the OIM receives 912 information from the ETM describing the execution. This information includes, for example, the type, amount, and price of securities traded, the time of execution, and/or information identifying the original order in the OMS database 114 on which the execution was based. The OIM 320 converts 914 the received information about the execution into the format used by the OMS 312. Then, the OIM 320 updates 916 the OMS database 114 with the converted execution data. As a result of these steps, the OMS 312 is updated automatically and transparently to reflect executions performed at the ETM 110. The executions appear to the OMS 312 as typical trades conducted at another broker.

In summary, the present invention includes an electronic trading marketplace that generates liquidity, at least in part, by receiving order information directly from the databases of OMS systems at trading institutions. Since orders are extracted from the OMS databases automatically, and information about executed orders is inserted into the databases automatically, the OMS databases "see" the marketplace as "just another market intermediary." Moreover, traders are able to conduct trades in the electronic marketplace without any duplicative manual efforts.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:
1. A computer-implemented method, comprising:
(i) automatically obtaining, without manual intervention, data from a plurality of data fields concerning all records of open orders for a plurality of securities from a data storage associated with an order management system, wherein:
  a. the records of open orders satisfy predetermined filtering criteria;
  b. the data storage is associated with a trading firm;
  c. the order management system is coupled to at least one workstation utilized by the trading firm;
  d. the records of open orders include at least the following fields: (1) security name, symbol or identifier, (2) transaction type, and (3) at least one quantity; and
  e. the data is obtained by a computer with one or more processors and a memory;
(ii) automatically converting, without manual intervention, the data from the plurality of data fields into non-binding indications of trading interest by a data integration module associated with or having access to at least one electronic marketplace, each non-binding indication comprising at least a security name, symbol or identifier, and a transaction type, wherein the non-binding indications require at least one further manual affirmative action prior to any trade execution and wherein the data integration module comprising a computer with one or more processors and a memory;
(iii) automatically, periodically obtaining, without manual intervention, updated data from at least one data field for at least one record of order that has changed since previously obtained from the data storage associated with the order management system, wherein the updated data is obtained by a computer with one or more processors and a memory; and (iv) for the at least one record of order that has changed since previously obtained from the data storage, automatically updating by the data integration module, with the updated data, without manual intervention, the non-binding indication of trading interest associated with that record of order.

2. The method of claim 1, wherein the non-binding indications of trading interest further comprise at least an available quantity, such available quantity being determined from the obtained data fields.

3. The method of claim 1, further comprising automatically matching at least one non-binding indication with a contra interest and providing an indication of the match to a workstation utilized by the trading firm.

4. The method of claim 3, further comprising executing a trade based upon the match of the non-binding indication and the contra interest.

5. The method of claim 1, wherein the further manual affirmative action is a negotiation between parties, or agents of parties, to a potential transaction.

6. The method of claim 1, further comprising converting, in response to an instruction received at the data integration module, a non-binding indication of trading interest into an executable order to trade securities.

7. The method of claim 6, further comprising executing a trade based upon the match of the executable order with a contra interest.

8. The method of claim 1, wherein the further manual affirmative action is an instruction from a party, or an agent for a party, to convert a non-binding indication of trading interest into an executable order to trade securities.

9. The method of claim 1, wherein at least some of the predetermined filtering criteria applied to the records of open orders are based upon the type of security.

10. The method of claim 1, wherein at least some of the predetermined filtering criteria applied to the records of open orders are based upon the quantity of security to be traded.

11. The method of claim 1, wherein the predetermined filtering criteria applied to the records of open orders are established before entry of the records of open orders in the order management system.

12. The method of claim 1, wherein the predetermined filtering criteria applied to the records of open orders are established after entry of the records of open orders in the order management system.

13. The method of claim 1, wherein in step (iv) the non-binding indication of interest is updated only upon satisfaction of updating criteria determined prior to entry of the at least one record of order in the order management system.

14. The method of claim 11, wherein in step (iv) the non-binding indication of interest is updated only upon satisfaction of updating criteria determined prior to entry of the at least one record of order in the order management system.

15. A computer-implemented method, comprising:
(i) automatically obtaining, without manual intervention, data from a plurality of data fields concerning all records of open orders for a plurality of securities from a data storage associated with an order management system, wherein:
   a. the records of open orders satisfy predetermined filtering criteria;
   b. the data storage is associated with a trading firm and the order management system is coupled to at least one workstation utilized by the trading firm;
   c. the records of open orders include at least the following fields: (1) security name, symbol or identifier, (2) transaction type, and (3) at least one quantity;
   d. the data from a plurality of data fields are received as non-binding indications of trading interest by a data integration module associated with or having access to at least one electronic marketplace, and each non-binding indication comprises at least a security name, symbol or identifier, and a transaction type;
   e. the non-binding indications require at least one further manual affirmative action prior to any trade execution; and
   f. the data integration module comprising a computer with one or more processors and a memory;
(ii) automatically, periodically obtaining, without manual intervention, updated data from at least one data field for at least one record of order that has changed since previously obtained from the data storage associated with the order management system, wherein the updated data is obtained by a computer with one or more processors and a memory; and
(iii) for the at least one record of order that has changed since previously obtained from the data storage, automatically updating by the data integration module, with the updated data, without manual intervention, the non-binding indication of trading interest associated with that record of order.

16. The method of claim 15, wherein the non-binding indications of trading interest further comprise at least an available quantity, such available quantity being determined from the obtained data fields.

17. The method of claim 15, further comprising automatically matching at least one non-binding indication with a contra interest and providing an indication of the match to a workstation utilized by the trading firm.

18. The method of claim 17, further comprising executing a trade based upon the match of the non-binding indication and the contra interest.

19. The method of claim 15, wherein the further manual affirmative action is a negotiation between parties, or agents of parties, to a potential transaction.

20. The method of claim 15, further comprising converting, in response to an instruction received at the data integration module, a non-binding indication of trading interest into an executable order to trade securities.

21. The method of claim 20, further comprising executing a trade based upon the match of the executable order with a contra interest.

22. The method of claim 15, wherein the further manual affirmative action is an instruction from a party, or an agent for a party, to convert a non-binding indication of trading interest into an executable order to trade securities.

23. The method of claim 15, wherein at least some of the predetermined filtering criteria applied to the records of open orders are based upon the type of security.

24. The method of claim 15, wherein at least some of the predetermined filtering criteria applied to the records of open orders are based upon the quantity of security to be traded.

25. The method of claim 15, wherein the predetermined filtering criteria applied to the records of open orders are established before entry of the records of open orders in the order management system.

26. The method of claim 15, wherein the predetermined filtering criteria applied to the records of open orders are established after entry of the records of open orders in the order management system.

27. The method of claim 15, wherein in step (iii) the non-binding indication of interest is updated only upon satisfaction of updating criteria determined prior to entry of the at least one record of order in the order management system.

28. The method of claim 25, wherein in step (iii) the non-binding indication of interest is updated only upon satisfaction of updating criteria determined prior to entry of the at least one record of order in the order management system.

29. A programmed computer system, comprising:
a memory having at least one region for storing computer executable program code; and
a processor for executing the program code stored in the memory, wherein the program code comprises:
(i) code to automatically obtain, without manual intervention, data from a plurality of data fields concerning all records of open orders for a plurality of securities from a data storage associated with an order management system, wherein:
   a. the records of open orders satisfy predetermined filtering criteria;
   b. the data storage is associated with a trading firm;
   c. the order management system is coupled to at least one workstation utilized by the trading firm; and
   d. the records of open orders include at least the following fields: (1) security name, symbol or identifier, (2) transaction type, and (3) at least one quantity;
(ii) code to automatically convert, without manual intervention, data from the plurality of data fields into non-binding indications of trading interest by a data integration module associated with or having access to at least one electronic marketplace, each non-binding indication comprising at least a security name, symbol or identifier, and a transaction type, wherein the non-binding indications require at least one further manual affirmative action prior to any trade execution;
(iii) code to automatically, periodically obtain, without manual intervention, updated data from at least one data field for at least one record of order that has changed since previously obtained from the data storage associated with the order management system; and
(iv) for the at least one record of order that has changed since previously obtained from the data storage, code to automatically update by the data integration module, with the updated data, without manual intervention, the non-binding indication of trading interest associated with that record of order.

30. The programmed computer system of claim 29, wherein the non-binding indications of trading interest further comprise at least an available quantity, such available quantity being determined from the obtained data fields.

31. The programmed computer system of claim 29, wherein the program code further comprises code to automatically match at least one non-binding indication with a contra interest and providing an indication of the match to a workstation utilized by the trading firm.

32. The programmed computer system of claim 31, wherein the program code further comprises code to execute a trade based upon the match of the non-binding indication and the contra interest.

33. The programmed computer system of claim 29, wherein the further manual affirmative action is a negotiation between parties, or agents of parties, to a potential transaction.

34. The programmed computer system of claim 29, wherein the program code further comprises code to convert, in response to an instruction received at the data integration module, a non-binding indication of trading interest into an executable order to trade securities.

35. The programmed computer system of claim 34, wherein the program code further comprises code to execute a trade based upon the match of the executable order with a contra interest.

36. The programmed computer system of claim 29, wherein the further manual affirmative action is an instruction from a party, or an agent for a party, to convert a non-binding indication of trading interest into an executable order to trade securities.

37. The programmed computer system of claim 29, wherein at least some of the predetermined filtering criteria applied to the records of open orders are based upon the type of security.

38. The programmed computer system of claim 29, wherein at least some of the predetermined filtering criteria applied to the records of open orders are based upon the quantity of security to be traded.

39. The programmed computer system of claim 29, wherein the predetermined filtering applied to the records of open orders are established before entry of the records of open orders in the order management system.

40. The programmed computer system of claim 29, wherein the predetermined filtering applied to the records of open orders are established after entry of the records of open orders in the order management system.

41. The programmed computer system of claim 29, wherein the non-binding indication of interest is updated only upon satisfaction of updating criteria determined prior to entry of the at least one record of order in the order management system.

42. The programmed computer system of claim 39, wherein in the non-binding indication of interest is updated only upon satisfaction of updating criteria determined prior to entry of the at least one record of order in the order management system.

43. A programmed computer system, comprising:
a memory having at least one region for storing computer executable program code; and
a processor for executing the program code stored in the memory, wherein the program code comprises:
(i) code to automatically obtain, without manual intervention, data from a plurality of data fields concerning all records of open orders for a plurality of securities from a data storage associated with an order management system, wherein:
   a. the records of open orders satisfy predetermined filtering criteria;
   b. the data storage is associated with a trading firm and the order management system is coupled to at least one workstation utilized by the trading firm;
   c. the records of open orders include at least the following fields: (a) security name, symbol or identifier, (b) transaction type, and (c) at least one quantity;
   d. the data from the plurality of data fields are received as non-binding indications of trading interest at a data integration module associated with or having access to at least one electronic marketplace, and each non-binding indication comprises at least a security name, symbol or identifier, and a transaction type; and
   e. the non-binding indications require at least one further manual affirmative action prior to any trade execution;
(ii) code to automatically, periodically obtain, without manual intervention, updated data from at least one data field for at least one record of order that has changed since previously obtained from the data storage associated with the order management system; and (iii) for the at least one record of order that has changed since previously obtained from the data storage, code to automatically update by the data integration module, with the updated data, without manual intervention, the non-binding indication of trading interest associated with that record of order.

44. The programmed computer system of claim 43, wherein the non-binding indications of trading interest further comprise at least an available quantity, such available quantity being determined from the obtained data fields.

45. The programmed computer system of claim 43, wherein the program code further comprises code to automatically match at least one non-binding indication with a contra interest and providing an indication of the match to a workstation utilized by the trading firm.

46. The programmed computer system of claim 45, wherein the program code further comprises code to execute a trade based upon the match of the non-binding indication and the contra interest.

47. The programmed computer system of claim 43, wherein the further manual affirmative action is a negotiation between parties, or agents of parties, to a potential transaction.

48. The programmed computer system of claim 43, wherein the program code further comprises code to convert, in response to an instruction received at the data integration module, a non-binding indication of trading interest into an executable order to trade securities.

49. The programmed computer system of claim 48, wherein the program code further comprises code to execute a trade based upon the match of the executable order with a contra interest.

50. The programmed computer system of claim 43, wherein the further manual affirmative action is an instruction from a party, or an agent for a party, to convert a non-binding indication of trading interest into an executable order to trade securities.

51. The programmed computer system of claim 43, wherein at least some of the predetermined filtering criteria applied to the records of open orders are based upon the type of security.

52. The programmed computer system of claim 43, wherein at least some of the predetermined filtering criteria applied to the records of open orders are based upon the quantity of security to be traded.

53. The programmed computer system of claim 43, wherein the predetermined filtering criteria applied to the records of open orders are established before entry of the records of open orders in the order management system.

54. The programmed computer system of claim 43, wherein the predetermined filtering criteria applied to the records of open orders are established after entry of the records of open orders in the order management system.

55. The programmed computer system of claim 43, wherein the non-binding indication of interest is updated only upon satisfaction of updating criteria determined prior to entry of the at least one record of order in the order management system.

56. The programmed computer system of claim 53, wherein in the non-binding indication of interest is updated only upon satisfaction of updating criteria determined prior to entry of the at least one record of order in the order management system.

* * * * *